No. 773,712. PATENTED NOV. 1, 1904.
T. E. CASTLEBERRY.
AUTOMATIC TRAP.
APPLICATION FILED JULY 22, 1904.
NO MODEL.

Witnesses

Inventor
Thomas E. Castleberry
By Thomas P. Simpson
Attorney

No. 773,712. Patented November 1, 1904.

UNITED STATES PATENT OFFICE.

THOMAS EDWIN CASTLEBERRY, OF MODESTO, CALIFORNIA.

AUTOMATIC TRAP.

SPECIFICATION forming part of Letters Patent No. 773,712, dated November 1, 1904.

Application filed July 22, 1904. Serial No. 217,728. (No model.)

*To all whom it may concern:*

Be it known that I, THOMAS EDWIN CASTLEBERRY, a citizen of the United States, residing at Modesto, in the county of Stanislaus and State of California, have invented certain new and useful Improvements in Automatic Traps for Gas-Pipes; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates generally to gas and water pipe fittings, while its special object is to make an automatic trap for gas-pipes.

The invention will first be described in connection with the drawings and then pointed out in the claim.

Figure 1:
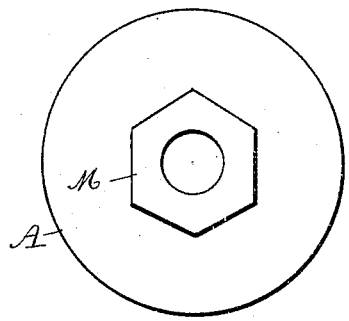
Figure 2:
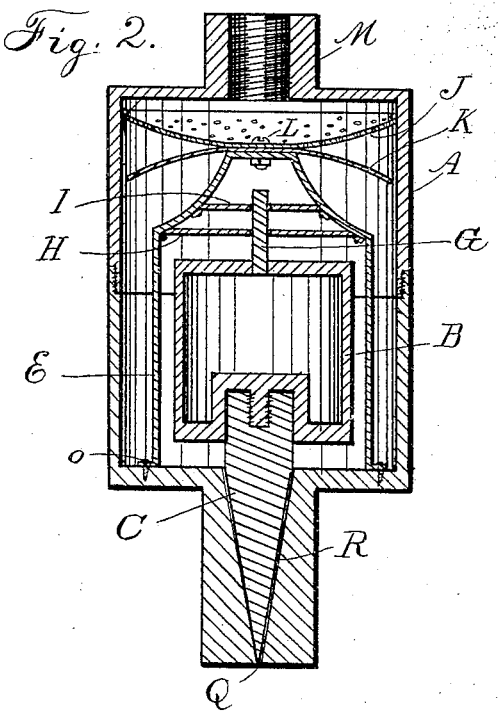
Figure 3:
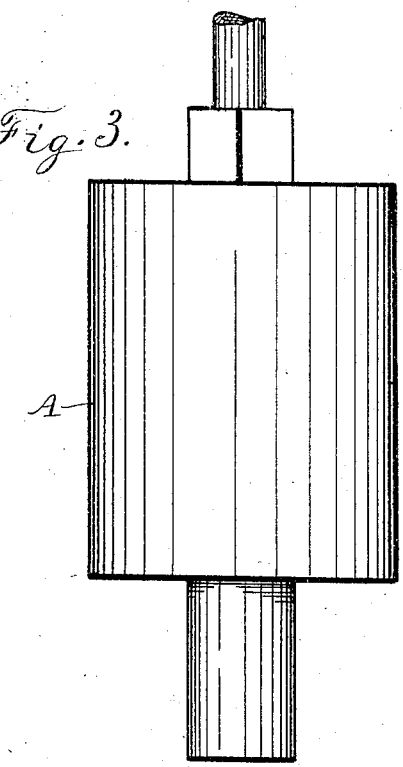

Figure 1 is a plan view of my invention; Fig. 2, a vertical section on the dotted line $x$ $x$ of Fig. 1, and Fig. 3 a side elevation showing my trap attached to the gas-pipe.

In the drawings, A represents the water-tight shell in which I suspend the float B, that carries the valve C. The shell has a corresponding seat R, in which the valve fits tightly and which has an outlet Q at the lower end.

E is a frame fastened at bottom by screws O O to the shell A and provided at top with the guide-bars H I, through which passes the float guide-pin G. At the top of the frame E and fastened thereto by a screw L are two oppositely-convex disks J K, the upper one perforated to form a strainer and the lower one imperforate to cause its water to flow to the circumference and thence drop to the bottom of shell.

At the upper end of the shell A is formed a fixed nut M, which screws on the gas-pipe.

Gas-pipes are usually placed at such an inclination as will permit the water to run down to a point where is placed an outlet-cap. In order to reach these caps, a man must dig down to each one in order to remove it and let the water escape, while my automatic trap saves all this labor and expense. In practice my trap prevents the egress of water until the latter has accumulated sufficiently to raise the float and valve. The water from the gas-pipe first passes through the strainer J, then falls upon the convex back of the disk K, and thence from its circumference to the bottom of the shell. Here it accumulates until the valve is raised.

Having thus fully described my invention, what I claim as new, and desire to protect by Letters Patent, is—

In combination with the shell A, float B and strainers J K, a frame E made fast to bottom of shell, at top to oppositely-convex strainers J K, and provided with guides H I for float-stem as shown and described, for the purpose set forth.

In testimony whereof I have affixed my signature in presence of two witnesses.

THOMAS EDWIN CASTLEBERRY.

Witnesses:
J. A. THAYER,
K. S. STEELE.